(12) United States Patent
Yasumoto et al.

(10) Patent No.: US 8,128,988 B2
(45) Date of Patent: Mar. 6, 2012

(54) FILM-FORMED ARTICLE AND METHOD FOR PRODUCING SAME

(75) Inventors: Kenji Yasumoto, Kanagawa (JP); Hibiki Itoh, Kanagawa (JP); Tohru Yamamoto, Kanagawa (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 1026 days.

(21) Appl. No.: 11/659,542

(22) PCT Filed: Aug. 10, 2005

(86) PCT No.: PCT/JP2005/014695
§ 371 (c)(1),
(2), (4) Date: Feb. 6, 2007

(87) PCT Pub. No.: WO2006/016627
PCT Pub. Date: Feb. 16, 2006

(65) Prior Publication Data
US 2007/0202390 A1    Aug. 30, 2007

(30) Foreign Application Priority Data
Aug. 10, 2004 (JP) .................. 2004-233724

(51) Int. Cl.
*B05D 5/12* (2006.01)
(52) U.S. Cl. ................ 427/100; 427/126.3
(58) Field of Classification Search ............ 427/100, 427/126.3
See application file for complete search history.

(56) References Cited

U.S. PATENT DOCUMENTS

| | | | | |
|---|---|---|---|---|
| 4,547,437 A * | 10/1985 | Isenberg et al. | ............. | 429/30 |
| 4,562,124 A * | 12/1985 | Ruka | ............. | 429/30 |
| 5,496,655 A * | 3/1996 | Lessing | ............. | 429/34 |
| 5,509,189 A * | 4/1996 | Tuller et al. | ............. | 29/623.1 |
| 5,741,605 A * | 4/1998 | Gillett et al. | ............. | 429/31 |
| 5,958,304 A | 9/1999 | Khandkar et al. | | |
| 6,747,317 B2 * | 6/2004 | Kondo et al. | ............. | 257/347 |
| 7,122,264 B2 | 10/2006 | Nishi et al. | | |

FOREIGN PATENT DOCUMENTS

| | | |
|---|---|---|
| EP | 0562411 | 9/1993 |
| EP | 0696824 | 2/1996 |
| EP | 1253660 | 10/2002 |
| EP | 1433767 | 6/2004 |

(Continued)

OTHER PUBLICATIONS

K. Yasumoto, Oh. Itoh, and T. Yamamoto, Characteristics of Anode Supported SOFC with Interconnect Membrane; The 10th FCDIC Fuel Cell Symposium Proceedings; May 13-14, 2003; pp. 254-259.

*Primary Examiner* — Brian K Talbot
(74) *Attorney, Agent, or Firm* — Notaro, Michalos & Zaccaria P.C.

(57) ABSTRACT

A dense interconnector film is formed over a fuel electrode, while preventing calcium included in material for the interconnector from solid phase reaction with zirconia included in material for the fuel electrode. When forming the interconnector film 5 made of lanthanum chromite-based perovskite type oxide which includes calcium in its composition includes calcium to the fuel electrode 2 of which composition includes zirconia, a intermediate layer 6 is formed on the fuel electrode 2, by using $(Sr_{0.9}La_{0.1})(Ti_{0.9}Nb_{0.1})O_3$, and then onto the intermediate layer 6, the interconnector film 5 is formed.

9 Claims, 6 Drawing Sheets

FOREIGN PATENT DOCUMENTS

| | | |
|---|---|---|
| JP | 04 149024 | 5/1992 |
| JP | 08 306361 | 11/1996 |
| JP | 11 283642 | 10/1999 |
| JP | 2001 052725 | 2/2001 |
| JP | 2003 243001 | 8/2003 |
| JP | 2003 288919 | 10/2003 |
| JP | 2004 071360 | 3/2004 |
| JP | 2004 247085 | 9/2004 |
| JP | 2004 247087 | 9/2004 |
| JP | 2006 040822 | 2/2006 |
| WO | WO 00/74159 | 12/2000 |
| WO | WO 03/052858 | 6/2003 |

\* cited by examiner

FILM-FORMED ARTICLE AND METHOD FOR PRODUCING SAME

TECHNICAL FIELD

This invention relates to a film formed article and a method for manufacturing thereof. More particularly, this invention relates to a film formed article which is suitable for forming an interconnector on the fuel electrode (anode) of a solid oxide fuel cell and a method for manufacturing thereof.

BACKGROUND ART

In the flat type solid oxide fuel (SOFC) disclosed in the patent document 1, each single cell is composed of a porous fuel electrode, a electrolyte film formed on the surface or the rear face of the porous fuel cell, an air electrode (cathode) film formed on the electrolyte film, an interconnector film formed on the other face of the porous fuel electrode, and a porous air electrode contacted with the air electrode film. Then, the single cells are stacked up and manifold boards are attached on the respective sides of the obtained stack in order to form a cell stack. As the fuel electrode, a sintered body of a mixture of nickel (nickel oxide in the manufacturing process) and yttria stabilized zirconia (YSZ) is disclosed.

As for the interconnector (it is also called "separator"), it is demanded to be dense so as to separate the supplied fuel gas and air without mixing them, to have a high electrical conductivity in order to connect electrically the adjacent cells mutually, and to have an thermal expansion coefficient which is analogous to those of other components of the cell. Lanthanum chromite-based oxides have been used as the material for the interconnector which can satisfy such demands. Moreover, it has been also done to dope calcium to the lanthanum chromite-based oxide in order to obtain a dense film. As methods for forming the interconnector film, slurry coating method, coating and thermal decomposition method, and sol-gel method are disclosed in the patent document 1.

Patent document 1: PCT/JP99/02897 (International publication No.: WO 00/74159)

DISCLOSURE OF THE INVENTION

Problems to be Solved by the Invention

However, as a result of our numerous experiments and studies, we, the inventors, have found and learnt that the lanthanum and calcium which had been included in the material for the interconnector flowed out into the fuel electrode under the influence of heat during a process of forming the interconnector film on the fuel electrode, for example, by the slurry coating method wherein a slurry was coated on the fuel electrode and then sintered, and the flowed components induced a chemical reaction (solid phase reaction) with zirconia which had been included in a fuel electrode material. Since the calcium which was inherently included for obtaining a dense interconnector film is absorbed to the fuel electrode material through the diffusion and the solid phase reaction, pores are formed in the interconnector. Thus, it is impossible to form the dense interconnector intended. Additionally, as a result of above mentioned solid phase reaction, a substance of which electric resistance is high and the heat expansion behavior is greatly different from other components of the cell (pyrochlore type oxide (for instance, lanthanum zirconate $La_2Zr_2O_7$, etc.)) comes into being.

Further, when stacking the single cells, the interconnector of a certain cell is obliged to make contact with the air electrode of another cell. In this case, there is a fear that the calcium which has been included in the interconnector material flows out into the air electrode, and thus pores are formed in the interconnector, if a material which includes zirconia (for instance, YSZ, etc.) is used as an air electrode.

Further, even in the case that the fuel electrode is composed of a composition other than that having zirconia, when the fuel electrode is made of a material system which includes a composition which can form solid solution with calcium, there is a fear that the calcium which has been included in the interconnector induces a solid phase reaction with materials which compose the fuel electrode, and thus the calcium flows out into the fuel electrode from the film material.

Therefore, this invention aims to provide a structure of the film formed article capable of inhibiting the unfavorable chemical reaction of between a base member such as the fuel electrode and a film member, such as the interconnector, which is formed on the base member, and which is made of a lanthanum chromite-based perovskite type oxide which includes calcium in its composition, wherein the chemical reaction will cause degression of the inherent properties of the base member or film member, and method for manufacturing thereof.

Means for Solving the Problems

In order to achieve the purpose, in the method for manufacturing a film formed article wherein a film member made of a lanthanum chromite-based perovskite type oxide which includes calcium (Ca) in its composition is formed over a base member which comprises a composition capable of forming solid solution with calcium, this invention is characterized by forming as film an intermediate layer which comprises as the main ingredient a single phase perovskite type oxide on the base member, and forming the film member on the intermediate layer, and wherein the single phase perovskite type oxide is represented by a chemical formula:

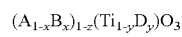

wherein A is one or more elements selected from a group of alkaline earth metal elements other than radium (Ra); B is one or more elements selected from a group of elements of scandium (Sc), yttrium (Y), and lanthanoids; D is one or more elements selected from a group of transition metal elements which belong to the fourth, fifth and sixth periods of the periodic table except platinum (Pt) and radioelements, and typical metal elements except 1A family elements, mercury (Hg), radium (Ra) and polonium (Po); and $0<x\leq0.5$, $0\leq y\leq0.5$ and $-0.05\leq z\leq 0$.

Further, a film formed article according to the present invention comprises a base member which comprises a composition capable of forming solid solution with calcium (Ca); an intermediate layer which comprises as the main ingredient a single phase perovskite type oxide and which is formed on the base member; and a film member which is made of a lanthanum chromite-based perovskite type oxide which includes calcium (Ca) in its composition and which is formed on the intermediate layer; and wherein the single phase perovskite type oxide is represented by a chemical formula:

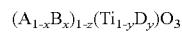

wherein A is one or more elements selected from a group of alkaline earth metal elements other than radium (Ra); B is one or more elements selected from a group of elements of scandium (Sc), yttrium (Y) and lanthanoids; D is one or more elements selected from a group of transition metal elements which belong to the fourth, fifth and sixth periods of the periodic table except platinum (Pt) and radioelements, and typical metal elements except 1A family elements, mercury (Hg), radium (Ra) and polonium (Po); and $0<x\leq0.5$, $0\leq y\leq0.5$ and $-0.05\leq z\leq0$.

Therefore, by the presence of the intermediate layer, it is possible to inhibit the solid phase reaction between calcium which has been included in the film member and the materials which composes the base member, and to prevent calcium which has been included in the film member from outflowing into the base material. As a result, it is possible to prevent the film member from pore generation. For example, in the case that the film member is formed by the slurry coating method, the calcium is not diffused into the base member even in a high temperature atmosphere on the film sintering. Thus, it is possible to form a dense film over the base member, and to maintain the dense texture stably, namely, to realize the long-term stability of the film formed article.

In addition, from a viewpoint of bring the thermal expansion coefficient of the intermediate layer close to that of the base member or film member, and a viewpoint of enhancing the electrical conductivity and improving the chemical stability which are necessitated for the intermediate layer, it is preferable that the material for the intermediate layer is represented by a chemical formula:

$$(Sr_{1-x}B_x)_{1-z}(Ti_{1-y}D_y)O_3$$

wherein B is one or more elements selected from a group of elements of scandium (Sc), yttrium (Y) and lanthanoids; and D is one or more elements selected from a group of transition metal elements which belong to the fourth, fifth and sixth periods of the periodic table except platinum (Pt) and radioelements, and typical metal elements except 1A family elements, mercury (Hg), radium (Ra) and polonium (Po); and $0<x\leq0.5$, $0\leq y\leq0.5$ and $-0.05\leq z\leq0$.

More preferably, it is represented by $(Sr_{1-x}B_x)_{1-z}(Ti_{1-y}D_y)O_3$, wherein B is one or more elements selected from a group of elements of scandium (Sc), yttrium (Y) and lanthanoids; and D is one or more elements selected from a group of elements of vanadium (V), niobium (Nb) and tantalum (Ta); and $0<x\leq0.5$, $0\leq y\leq0.5$ and $-0.05\leq z\leq0$.

Most preferable, it is represented by $(Sr_{1-x}La_x)_{1-z}(Ti_{1-y}Nb_y)O_3$, wherein $0<x\leq0.5$ and $0\leq y\leq0.5$ and $-0.05\leq z\leq0$.

Since the effectiveness about the material for the intermediate layer which is represented by the chemical formula:

$$(Sr_{1-x}La_x)_{1-z}(Ti_{1-y}Nb_y)O_3$$

wherein $0<x\leq0.5$, $0\leq y\leq0.5$ and $-0.05\leq z\leq0$, was actually confirmed by experiments, similar effects can be expected in the cases that a part of or all of the elements which compose the above mentioned material for the intermediate layer are respectively substituted by one or more elements which are known as elements showing same or analogical properties with the element to be substituted.

Further, this invention is characterized by the fact that, in the method for manufacturing a film formed article wherein an interconnector film made of a lanthanum chromite-based perovskite type oxide which includes calcium (Ca) in its composition is formed to a fuel electrode of a solid oxide fuel cell, an intermediate layer which comprises as the main ingredient a single phase perovskite type oxide is formed on the fuel electrode, and the interconnector film is formed on the intermediate layer, and wherein the single phase perovskite type oxide is represented by a chemical formula:

$$(A_{1-x}B_x)_{1-z}(Ti_{1-y}D_y)O_3$$

wherein A is one or more elements selected from a group of alkaline earth metal elements other than radium (Ra); B is one or more elements selected from a group of elements of scandium (Sc), yttrium (Y) and lanthanoids; D is one or more elements selected from a group of transition metal elements which belong to the fourth, fifth and sixth periods of the periodic table except platinum (Pt) and radioelements, and typical metal elements except 1A family elements, mercury (Hg), radium (Ra) and polonium (Po); and $0<x\leq0.5$, $0\leq y\leq0.5$ and $-0.05\leq z\leq0$.

Thus, it is possible to form an interconnector film made of the calcium doped dense LCO (lanthanum chromite-based perovskite type oxide) over the fuel electrode with ease and at a low cost, while in the prior art the such a film formation is impossible or hardly possible because of the outflow of calcium into the fuel electrode on the heat treatment at the film formation. Moreover, because the contact resistance (electric resistance in the contact part) between the fuel electrode and the interconnector can be greatly decreased while maintaining the denseness of the interconnector film by forming the interconnector film to the fuel electrode through the intermediate layer, the power generation performance (power output per a single cell) can be improved. In addition, because the operating temperature of the fuel cell can be set to about 1000° C. by adapting the interconnector film of LCO, the plant efficiency can be improved as compared with the case that a metallic separator or a metallic interconnector by which the operating temperature is compelled to become low. All in all, according to the present invention, it is possible to attain the cost reduction for manufacturing the fuel cell, realize the high-performance of the fuel cell and make the fuel cell compact.

In addition, in such a case, it is preferable to form on the surface of the interconnector film a protective layer which comprises as a main ingredient a single phase perovskite type oxide and which possesses electronic conduction properties. The above mentioned perovskite type oxide is represented by the chemical formula:

$$(A_{1-x}B_x)_{1-z}(D_{1-y}E_y)O_3$$

wherein A is one or more elements selected from a group of elements of scandium (Sc), yttrium (Y) and lanthanoids; B is one or more elements selected from a group of alkaline earth metal elements other than radium (Ra); and D and E are individually one or more elements selected from a group of transition metal elements which belong to the fourth, fifth and sixth periods of the periodic table except platinum (Pt) and radioelements, and typical metal elements except 1A family elements, mercury (Hg), radium (Ra) and polonium (Po); and $0<x\leq1$, $0\leq y\leq0.5$ and $-0.05\leq z\leq0$, providing that when B is calcium (Ca) D is not chromium (Cr).

Thus, even in the case that a material which includes zirconium (for example, YSZ, SSZ, etc.) is used for the air electrode, it is possible to prevent the calcium included in the interconnector material from flowing out into the air electrode when the cells are stacked, and to maintain stably various properties such as the denseness, electrical conductivity, and consistency of the thermal expansion behavior to the other members. Namely, it is possible to realize the long-term stability of the properties necessitated for the interconnector. The reason for providing that when B is calcium (Ca) D is not chromium (Cr) is that the function as the protective layer that protects the interconnector film can not be attained in such a combination of Ca and Cr, because in this combination the protective layer has an analogous composition with the interconnector film which comprises the lanthanum chromite-based perovskite type oxide which includes calcium in its composition and as a result of this fact these physical properties also come to show similarities. However, when D is the element other than Cr, Cr can be adaptable as E in any chemically stable combination.

In addition, from a viewpoint of bring the thermal expansion coefficient of the protective layer close to those of the other cell constitutive members, and a viewpoint of enhancing the electronic conductivity which is necessitated for the protective layer, it is preferable that the material for the protective layer is represented by a chemical formula:

$$(A_{1-x}B_x)_{1-z}(D_{1-y}E_y)O_3$$

wherein A is one or more elements selected from a group of elements of scandium (Sc), yttrium (Y) and lanthanoids; B is one or more elements selected from a group of magnesium (Mg), calcium (Ca), strontium (Sr) and barium (Ba), D is one or more elements selected from a group of transition metal elements which belong to 6A, 7A and 8 family elements in the fourth period of the periodic table; and E is one or more elements selected from a group of transition metal elements which belong to the fourth, fifth and sixth periods of the periodic table except platinum (Pt) and radioelements, and typical metal elements except 1A family elements, mercury (Hg), radium (Ra) and polonium (Po); and $0 < x \leq 1$, $0 \leq y \leq 0.5$ and $-0.05 \leq z \leq 0$ (providing that when B is calcium (Ca) D is not chromium (Cr)).

More preferably, it is represented by $(A_{1-x}B_x)_{1-z}(D_{1-y}E_y)O_3$ wherein A is one or more elements selected a group of elements of scandium (Sc), yttrium (Y) and lanthanoids; B is one or two elements selected from a group of elements of strontium (Sr) and calcium (Ca), D is one or more elements selected from a group of transition metal elements which belong to 6A, 7A and 8 family elements in the fourth period of the periodic table; and E is one or more elements selected from a group of transition metal elements which belong to the fourth period of the periodic table; and $0 < x \leq 1$, $0 \leq y \leq 0.5$ and $-0.05 \leq z \leq 0$ (providing that when B is calcium (Ca) D is not chromium (Cr)).

Most preferable, it is represented by $(La_{1-x}Sr_x)_{1-z}(D_{1-y}E_y)O_3$, wherein D is one or more elements selected from a group of transition metal elements which belong to 6A, 7A and 8 family elements in the fourth period of the periodic table; and E is one or more elements selected from a group of transition metal elements which belong to the fourth period of the periodic table; and $0 < x \leq 1$, $0 \leq y \leq 0.5$ and $-0.05 \leq z \leq 0$.

Since the effectiveness about the material for the protective layer of $(La_{1-x}Sr_x)_{1-z}MnO_3$ was actually confirmed by experiments, similar effects can be expected in the cases that a part of or all of the elements which compose the above mentioned $(La_{1-x}Sr_x)_{1-z}MnO_3$ are respectively substituted by one or more elements which are known as elements showing same or analogical properties with the element to be substituted.

In addition, the above mentioned fuel electrode is assumed to be the one which includes zirconia in its composition. In this case, by virtue of the intermediate layer, it is possible to inhibit the solid phase reaction between calcium which has been included in the film member of the interconnector and zirconia has been included in the fuel electrode, and to prevent calcium which has been included in the film member of the interconnector from outflowing into the fuel electrode. As a result, it is possible to prevent the film member from pore generation. Thus, it is possible to form a dense film over the fuel electrode, and to maintain the dense texture stably, namely, to realize the long-term stability of the film formed article.

EXPLANATION OF NUMERALS

Figure 1:
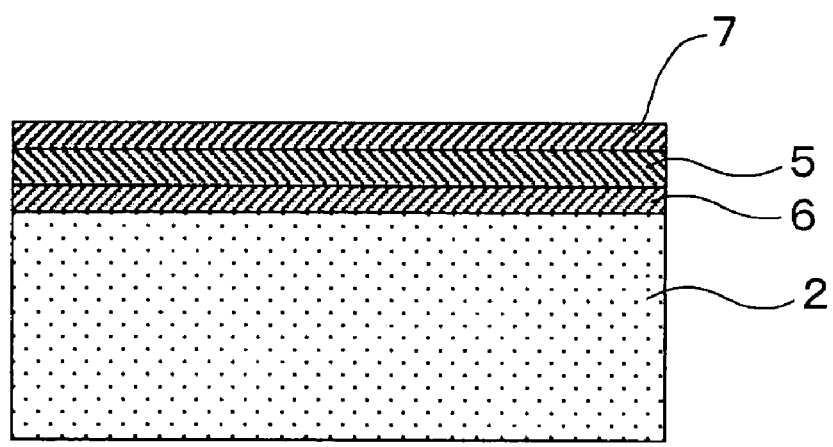
FIG. 1 is a constructive view which illustrates an embodiment of the film formed article according to the present invention.

1 Single Cell
2 Fuel electrode (Base member)
3 Electrolyte Film
4 Air Electrode Film
5 Interconnector film (Film member)
6 Intermediate Layer
7 Protective Layer

BEST MODE FOR CARRYING OUT THE INVENTION

Now, the constitution of the present invention will be described in detail based on the embodiments illustrated in the drawings.

One embodiment of the film formed article and the method for manufacturing thereof according to the present invention is illustrated in FIG. 1 to FIG. 6. The method for manufacturing the film formed article according to the present invention is characterized by the fact that, in the method for manufacturing a film formed article wherein an film member 5 made of a lanthanum chromite-based perovskite type oxide which includes calcium in its composition is formed to a base member 2 which includes zirconia in its composition, an intermediate layer 6 is formed as film on the base member 2, and the film member 5 is formed on the intermediate layer 6.

In addition, the method for manufacturing the film formed article according to the present invention is characterized by the fact that a protective film 7 is formed on the surface of the film formed article in which the film member 5 made of the lanthanum chromite-based perovskite type oxide which includes calcium in its composition has been formed.

Figure 2:
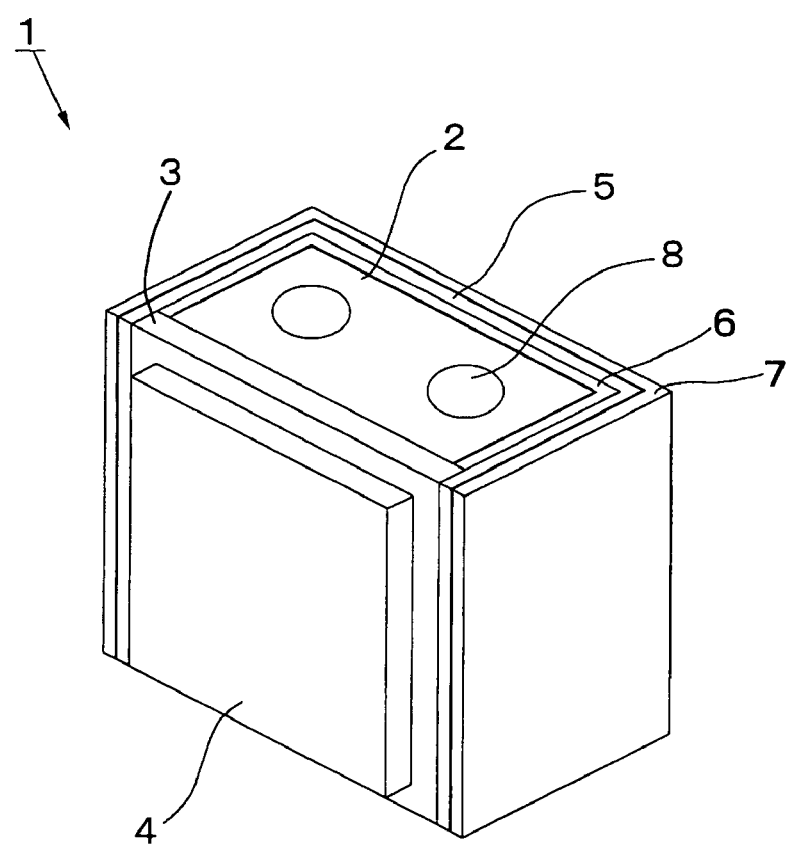
FIG. 2 is an oblique perspective view which illustrates an constructive example of the flat type solid oxide fuel cell.

In this embodiment, an explanation will be made about an example wherein the present invention is applied to the film formation of the interconnector film 5 to the fuel electrode 2 in the flat type solid oxide fuel cell execution form. In this embodiment, the fuel electrode 2 corresponds to the base member, and interconnector film 5 corresponds to the film member. In this flat type solid oxide fuel cell, for instance, as shown in FIG. 2, the fuel electrode 2 which functions as a supporting member (base member), an electrolyte film 3 which is formed on one face of the fuel electrode 2, an air electrode film 4 which is formed on the electrolyte film 3, and an interconnector film 5 which is formed on another face of the fuel electrode 2 constitute a single cell 1. In this single cell 1, the fuel electrode 2 is made of a board member in order to secure the strength of single cell 1 by this fuel electrode 2, and the electrolyte 3, the air electrode 4 and the interconnector 5 are formed respectively as membranous structure. For instance, film thicknesses of the electrolyte film 3, the air electrode film 4, and the interconnector film 5 are set individually so as to be about 1 μm-100 μm (for instance, the electrolyte film 3 is to be about 30 μm, the air electrode film 4 about 100 μm, and the interconnector film 5 about 40 μm, respectively), while the board thickness of the fuel electrode 2 as the base member is set so as to be several millimeters (for instance, about 1-10 mm). Incidentally, since the fuel electrode 2 is prepared as a porous form, the distribution of fuel gas is ensured sufficiently. In order to supply the fuel gas to the fuel electrode 2 more excellently, however, for instance, in this embodiment, fuel gas pathways 8 through which the fuel gas distributes are provided in the fuel electrode 2.

Figure 6:
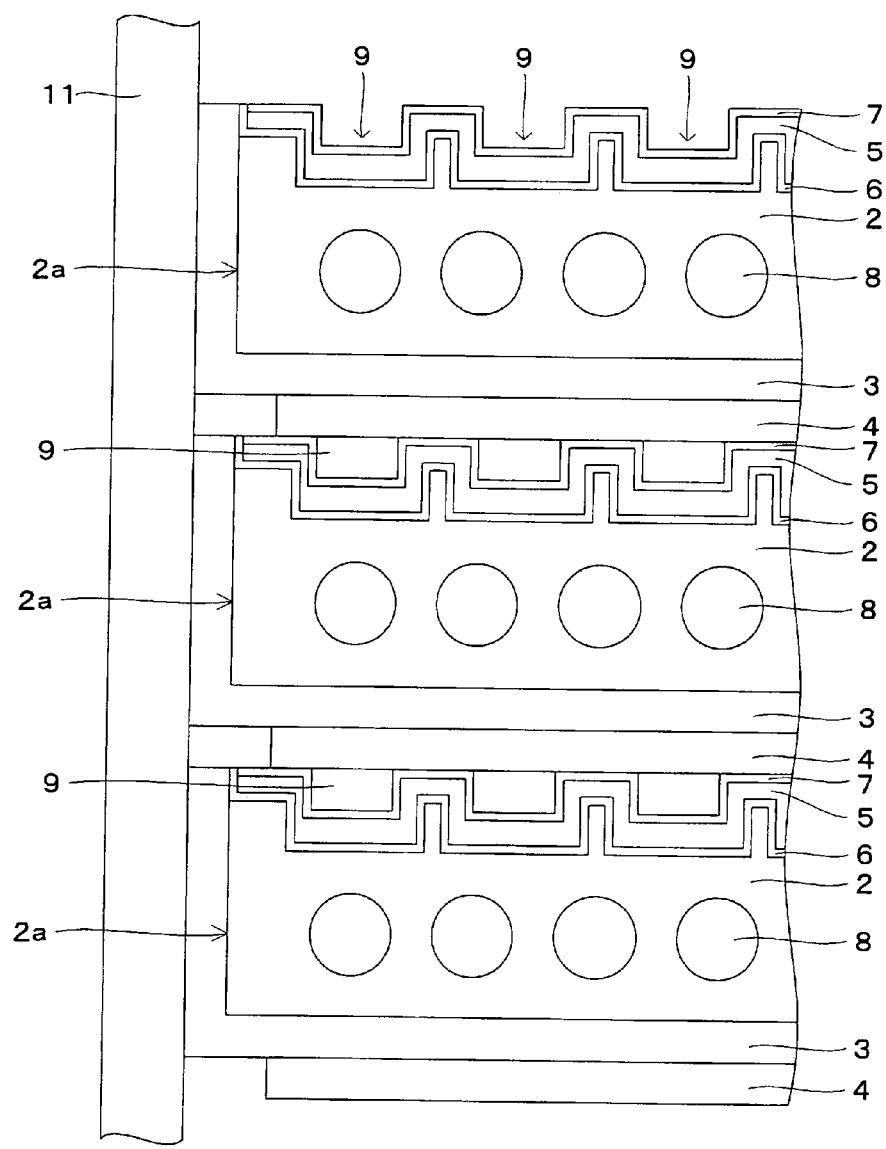
FIG. 6 It is a schematic side view which illustrates one example of construction of the cell stack of the flat type solid oxide fuel cell.

As the material for the fuel electrode in this embodiment, for example, a mixture of nickel oxide (where it changes into a metallic nickel under the operating state of the fuel cell) and stabilized zirconia in which 8 mol % of yttria is solved so as to form solid solution in order to stabilize the crystalline structure (NiO-8YSZ($(ZrO_2)_{0.92}(Y_2O_3)_{0.08}$) cermet is used. This mixture material of nickel and yttria stabilized zirconia (YSZ) has been generally used as the fuel electrode material of the solid oxide fuel cell. The fuel electrode 2 may compose of, for instance, a porous rectangular board member. This porous board member is formed so that the fuel gas may be able to distribute sufficiently therethrough, and the member may be able to provide an ample strength necessitated for the single cell 1 and to have an ample electrical conductivity for electron and oxygen ion. Incidentally, by making the fuel electrode 2 into a porous form, it is possible to enhance the power generation performance because the contact area to the solid electrolyte in the unit area of the electrode material can be enlarged. Moreover, it is also possible to heighten the strength against the thermal stress and the external force. In addition, because the cell stack can be made with a high strength, it is possible to improve the power generation performance of the cell stack when expanding the size of the porous fuel electrode 2, or the like. One embodiment of the constitution of the cell is illustrated in FIG. 6. In this figure, the numeral 2a denotes the side part of the fuel electrode, the numeral 9 denotes the air pathway, the numeral 11 denotes manifold board, respectively.

As the material which is to be used for the fuel electrode 2, the material for fuel electrode according to the invention of which patent application has been already filed by the identical applicant is especially desirable. This material for fuel electrode is a mixture of YSZ coarse particles which have relatively large particle sizes, YSZ minute particles which have relatively small particle sizes, and nickel oxide or nickel particles (See, JP 2004-71360 A and JP HEI8(1996)-306361 A). When using this mixture, since a framework can be formed in the interior of the fuel electrode 2 with the YSZ coarse particle, it is possible to enhance the strength of the single cell 1. In addition, since the change of porosity and the shrinkage of the volume in the high temperature and reducing atmosphere can be repressed specifically, it is possible to elongate the life time of the fuel electrode 2 and maintain the superior performance of the fuel electrode stably for a long time.

In the case that this fuel electrode 2 is prepared, the nickel oxide and the YSZ's are mixed, then, a binder such as methyl cellulose and polyvinyl alcohol is added thereto, and which may be followed by press molding. Alternatively, this mixture material of nickel oxide, YSZ's and the binder is brought into a clayey form, and the mixture material may be subject to extrusion molding. Then, the obtained molding material is sintered at about 1400° C. in order to obtain the porous fuel electrode 2. Here, the manufacturing conditions such as the pressure in the press or extrusion molding and the sintering temperature is adjusted so that the porous fuel electrode 2 to be obtained has a porosity capable of allowing the fuel gas to pass easily through the electrode, and provides a mechanical strength necessitated as the single cell 1. Here, when the mechanical strength of the porous fuel electrode 2 is set to be weaker than that of a solid body of the same material, the strength of the cell stack can be improved because it is possible to absorb and alleviate the thermal stress on the power generating operation of the cell stack.

However, the material for the fuel electrode 2 is not limited to the above-mentioned example. For instance, as the materials to be used for the fuel electrode 2, iron (Fe) and copper (Cu) can be mentioned preferably as an alternative to nickel (Ni), and SSZ (for example, $Zr_{0.89}Sc_{0.1}Ce_{0.01}O_2$) can be mentioned preferably as an alternative to YSZ. In addition, a material which is prepared by mixing two kinds of metals such as Ni—Fe—SSZ is also desirable.

The interconnector material in this embodiment is calcium-doped lanthanum chromite-based perovskite type oxide (LCO). This lanthanum chromite-based perovskite type oxide can be represented, for example, by the following composition formula.

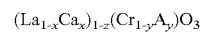  <Chemical formula 1>

In the above formula 1, a part of lanthanum (La) may be substituted by one or more elements selected from a group of 3A family elements (Sc, Y, and lanthanoids (Ce, Pr, Nd, Sm, Eu, Gd, Tb, Dy, Ho, Er, Tm, Yb, Lu)) other than lanthanum (La) and except promethium (Pm) and actinoids which are radioelements. A part of calcium (Ca) may be substituted by one or more elements selected by a group of alkaline earth metal elements (Be, Mg, Sr, Ba) except radium (Ra) which is a radioelement. The A in the above formula 1 is one or more elements, such as cobalt (Co) and magnesium (Mg), which can be substituted with a part of chromium (Cr). Further, the x, y, and z in the above formula 1 take the ranges of $0<x\leq0.5$, $0\leq y\leq0.5$, and $-0.05\leq z\leq0.1$, respectively. In the formula 1, the case when y=0 ($(La_{1-x}Ca_x)_{1-z}CrO_3$) is involved.

For instance, in this embodiment, the used as the interconnector material is $La_{0.75}Ca_{0.27}Cr_{0.9}Co_{0.1}O_3$, which has been generally used as this material. In fact, this material is made of mixed phases of (La,Ca)(Cr,Co)O$_3$ and CaO, and which is intended to form a dense film by virtue of adding a small amount of excessive CaO.

Intermediate layer 6 in this embodiment plays a role of preventing the chemical reaction (solid phase reaction) which may ruin the functions to be fitted by the fuel electrode 2 (for instance, electrical conductivity and gas diffusional capability, etc.) and the functions to be fitted by the interconnector films 5 (for instance, electrical conductivity, denseness, thermal resistance, and corrosion resistance, etc.) is ruined. Providing the intermediate layer 6 is established, it is possible to prevent the calcium included in the interconnector material from reacting with the zirconia (zirconium dioxide $ZrO_2$) included in the fuel electrode material. Particularly, $La_{0.75}Ca_{0.27}Cr_{0.9}Co_{0.1}O_3$ used as the interconnector-material in this embodiment contains calcium excessively, and thus this calcium tends to react with zirconia included in the fuel electrode with ease. Even in such a case, by the intermediate layer 6, this reaction can be prevented. As the material for such an intermediate layer 6, for example, a material which comprises as a main ingredient a single phase perovskite type oxide represented by the following composition formula is effective.

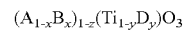  <Chemical formula 2>

The A in the above formula 2 is one or more elements selected from a group of alkaline earth metal elements (Be, Mg, Ca, Sr, Ba) except radium (Ra) which is a radioelement. Incidentally, in this specification, beryllium (Be) and magnesium (Mg) should be involved in the alkali earth metal elements. The B is one or more elements selected from a group of elements of scandium (Sc), yttrium (Y) and lanthanoids (La, Ce, Pr, Nd, Sm, Eu, Gd, Tb, Dy, Ho, Er, Tm, Yb, Lu) except radioelements. The D is one or more elements selected from a group of transition metal elements (Sc, Ti, V, Cr, Mn, Fe, Co, Ni, Cu, Y, Zr, Nb, Mo, Ru, Rh, Pd, Ag, lanthanoids, Hf, Ta, W, Re, Os, Ir, Au) which belong to the fourth, fifth and sixth periods of the periodic table except platinum (Pt) and radioelements, and typical metal elements (Be, Mg, Ca, Sr, Ba, Zn, Cd, Al, Ga, In, Ti, Ge, Sn, Pb, Sb, Bi) except 1A family elements, mercury (Hg), radium (Ra) and polonium (Po). Further, the x, y, and z in the above formula 2 can take the ranges of $0<x\leq0.5$, $0\leq y\leq0.5$, and $-0.05\leq z\leq0$, respectively; more desirably, take the ranges of $0<x\leq0.5$, $0\leq y\leq0.2$, and $-0.05\leq z\leq0$, respectively; and most desirably, take the ranges of $0<x\leq0.2$, $0\leq y\leq0.1$, and $z=0$, respectively. When $z>0$, it becomes an A site defective type, and there is a possibility that Ca as an alkaline earth metal element may be solved in the intermediate layer to a certain extent so as to form solid solution. Thus, it is undesirable. When $z\neq0$, there are some combinations incapable of becoming the perovskite group oxide. Therefore, from the viewpoint of obtaining the perovskite type oxide with ease, it is preferable to set $z=0$. In the formula 2, the case when $y=0$ $((A_{1-x}B_x)_{1-z}Ti_1O_3)$ is involved. As mentioned above, it is possible that the respective sites of A, B and D in the formula 2 may comprise not only a single element, but also a composition where a part of the element concerned as above is substituted with other one or more elements, individually. Namely, it is possible to take such a composition as $((A,A')_{1-x}(B,B')_x)_{1-z}(Ti_{1-y}(D,D')_y)O_3$. Moreover, the composition for which a part of titanium (Ti) element is substituted with other one or more elements can be taken.

In addition, from a viewpoint of bring the thermal expansion coefficient of the intermediate layer close to those of the other members, and a viewpoint of enhancing the electric conductivity necessitated for the intermediate layer 6, and improving the chemical stability, or the like, it is preferable to use $(Sr_{1-x}B_x)_{1-z}(Ti_{1-y}D_y)O_3$, which belongs to the above formula 2 and the A in the above formula 2 is strontium (Sr). It is more desirable that the D in $(Sr_{1-x}B_x)_{1-z}(Ti_{1-y}D_y)O_3$ is one or more element selected from a group of 5A family elements (vanadium (V), niobium (Nb), tantalum (Ta)). Especially, it was confirmed that $(Sr_{1-x}La_x)_{1-z}(Ti_{1-y}Nb_y)O_3$ showed good physical properties as the intermediate layer 6, that is, it has a thermal expansion coefficient which is analogous to those of the other materials for constituting the cell, and it gives a function of preventing effectively the solid phase reaction between zirconia included in the fuel electrode 2 and calcium included in the interconnector, by experiments. For instance, in this embodiment, $(Sr_{0.9}La_{0.1})(Ti_{0.9}Nb_{0.1})O_3$ is used as the material for the intermediate layer 6.

Although the perovskite type oxide represented by the above formula 2 has a fear that the electrical conductivity deteriorates when using it in the oxidizing atmosphere, the deterioration of the electrical conductivity can not be observed in the reducing atmosphere and it is stable as the perovskite type oxide. Thus it is suitable for preventing the calcium included in the interconnector material 5 from reacting with the zirconia (zirconium dioxide $ZrO_2$) included in the fuel electrode material 2 between the interconnector film 5 and the fuel electrode 2.

With respect to the material for the intermediate layer, it is most preferable to use a perovskite type oxide represented by the above formula 2 alone. However, the material may be a mixture of two or more compounds of the perovskite type oxides, or a composition which includes as a main ingredient the perovskite type oxide represented by the above formula 2, namely, a mixture which includes the perovskite type oxide represented by the above formula 2. For instance, a substance which can not affect a detrimental effect to the material for the fuel electrode and the material for the interconnector, and which carries preferable physical properties such as electrical conductivity, thermal resistance, corrosion resistance, and oxidation resistance, etc., may be mixed with the perovskite type oxide represented by the above formula 2 in order to prepare the material for the intermediate layer. For instance, a dense interconnector film 5 can be obtained without ruining the whole electrical conductivity by mixing a metal which can not affect a detrimental effect to LCO, NiO, and YSZ to the perovskite type oxide represented by the above formula 2. Further, in the case that the cell is used in a high temperature and reducing atmosphere and a metal oxide can be changed to metal by reduction, it is possible to mix the metal oxide with the perovskite type oxide represented by the above formula 2. As metals and metal oxides which can be mixed with the perovskite type oxide represented by the above formula 2, for example, transition metals which belong to 8 and 1B family elements in the fourth period of the periodic table, and oxides thereof can be cited, and the use of Ni, Fe, Cu and oxides thereof is particularly desirable. With respect to the mixing ratio of the metal or metal oxide to the material for intermediate layer, for example, it is preferable to be in the range of not more than 50% by volume of the whole of the materials for the intermediate layer.

Further, as for the material for the intermediate layer, a denseness may be required to the extent that the calcium which is included in the interconnector film 5 does not react with the zirconia which is included in the fuel electrode 2, that is, to the extent that the intermediate layer does not allow the calcium which is included in the interconnector film 5 to pass through it. Preferably, the denseness is desirable to be to the extent that the intermediate layer does not allow water vapor to pass through it.

In the solid oxide fuel cell according to this embodiment, the interconnector 5 which includes lanthanum chromite-based perovskite type oxide which includes calcium in its composition and which is provided at the air electrode side may be exposed to the oxidizing atmosphere. Air electrode 4 where the material including zirconia (for instance, YSZ and SSZ, etc.) is used may come into contact with this interconnector 5. In this case, the calcium included in interconnector material 5 would flow out to the air electrode 4 side. Therefore, pores will be formed in the interconnector 5, and thus, a problem that the dense film cannot be maintained will be arisen. Then, it is desirable that a protective layer 7 is applied between the interconnector 5 and the air electrode 4. This protective layer 7 plays the role of preventing the calcium which is included in interconnector material 5 from flowing out to an air electrode side. Particularly, $La_{0.75}Ca_{0.27}Cr_{0.9}Co_{0.1}O_3$ used as the interconnector material in this embodiment contains calcium excessively, and thus this calcium tends to flow out to the air electrode 4 with ease. Even in such a case, by the protective layer 7, this outflow can be prevented. As the material for such a protective layer 7, for example, a material which comprises as a main ingredient a single phase perovskite type oxide represented by the following composition formula and which possesses electronic conduction properties.

$(A_{1-x}B_x)_{1-z}(D_{1-y}E_y)O_3$         <Chemical formula 3>

In the above formula 3, the A is one or more elements selected from a group of elements of scandium (Sc), yttrium (Y) and lanthanoids (La, Ce, Pr, Nd, Sm, Eu, Gd, Tb, Dy, Ho, Er, Tm, Yb, Lu) except radioelements. The B is one or more elements selected from a group of alkaline earth metal elements (Be, Mg, Ca, Sr, Ba) except radium (Ra) which is a radioelement. The D and E are individually one or more elements selected from a group of transition metal elements (Sc, Ti, V, Cr, Mn, Fe, Co, Ni, Cu, Y, Zr, Nb, Mo, Ru, Rh, Pd, Ag, lanthanoids, Hf, Ta, W, Re, Os, Ir, Au) which belong to the fourth, fifth and sixth periods of the periodic table except platinum (Pt) and radioelements, and typical metal elements (Be, Mg, Ca, Sr, Ba, Zn, Cd, Al, Ga, In, Tl, Ge, Sn, Pb, Sb, Bi) except 1A family elements, mercury (Hg), radium (Ra) and polonium (Po).

Further, the x, y, and z in the above formula 3 can take the ranges of $0 < x \leq 1$, $0 \leq y \leq 0.5$, and $-0.05 \leq z \leq 0$, respectively. When $z > 0$, it becomes an A site defective type, and there is a possibility that Ca as an alkaline earth metal element may be solved in the protective layer 7 to a certain extent so as to form solid solution. Thus, it is undesirable. When $z \neq 0$, there are some combinations incapable of becoming the perovskite type oxide. Therefore, from the viewpoint of obtaining the perovskite type oxide with ease, it is preferable to set $z=0$. In the formula 3, the cases when $x=0$ and/or $y=0$ ($(A)_{1-z}(D_{1-y}E_y)O_3$, $(A_{1-x}B_x)_{1-z}(D)O_3$, $(A)_{1-z}(D)O_3$) are involved. As mentioned above, it is possible that the respective sites of A, B, D and E of above formula 3 may comprise not only a single element, but also a composition where a part of the element concerned as above is substituted with other one or more elements, individually. Namely, it is possible to take such a composition as $((A,A')_{1-x}(B,B')_x)_{1-z}((D,D')_{1-y}(E,E')_y)O_3$. For instance, $[(La_{0.7}Y_{0.1})(Sr_{0.1}Ca_{0.1})][(Mn_{0.8}Fe_{0.1})(Ti_{0.05}V_{0.05})]O_3$ may be adaptable.

However, in the above formula 3, the combination that when B is calcium (Ca), D is chromium (Cr) should be excluded. The reason is that the function as the protective layer 7 that protects the interconnector film 5 can not be attained in such a combination, because in this combination the protective layer 7 has an analogous composition with the interconnector film 5 (lanthanum chromite-based perovskite type oxide which includes calcium in its composition) and as a result of this fact these physical properties also come to show similarities. However, when D is the element other than chromium (Cr), Cr can be adaptable as E in any chemically stable combination.

Next, from a viewpoint of bring the thermal expansion coefficient of the protective layer close to those of the other cell constitutive members, and a viewpoint of enhancing the electronic conductivity which is necessitated for the protective layer 7, more desirable compositions of the above formula 3 will be described. With respect to the B of the above formula 3, it is more desirable to be one or more elements selected from a group of alkaline earth metal elements (Mg, Ca, Sr, Ba) except beryllium (Be) and radium (Ra) which is a radioelement. With respect to the D of the above formula 3, it is more desirable to be one element or any combination of two or more elements, wherein the element or elements are selected from a group of transition metal elements (Mn, Co, Fe, Ni, Cr) which belong to 6A, 7A and 8 family elements in the fourth period of the periodic table. Furthermore, it is most desirable that the B in the above formula 3 is strontium or calcium or the combination thereof. In addition, the E in the above formula 3 is most desirable to be one or more elements selected from a group of transition metal elements (Sc, Ti, V, Cr, Mn, Fe, Co, Ni, Cu) which belong to the fourth period of the periodic table.

Especially, $(La_{1-x}Sr_x)_{1-z}(D_{1-y}E_y)O_3$, which is a composition that in the above formula 3 the A is lanthanum (La) and the B is strontium (Sr), possesses good physical properties as the protective layer 7, that is, it has a high electronic conduction properties and also has a thermal expansion coefficient which is analogous to those of the other materials for constituting the cell. For instance, in this embodiment, $La_{0.6}Sr_{0.4}MnO_3$ is used as the material for the protective layer 7.

Although the perovskite type oxide represented by the above formula 3 has a fear that the electrical conductivity deteriorates when using it in the reducing atmosphere, the deterioration of the electrical conductivity can not be observed in the oxidizing atmosphere and it is stable as the perovskite type oxide. Thus it is suitable for preventing the calcium included in the interconnector material 5 from flowing out to the air electrode 4 side between the interconnector film 5 and the air electrode 4.

With respect to the material for the protective layer, it is most preferable to use a perovskite type oxide represented by the above formula 3 alone. However, the material may be a mixture of two or more compounds of the perovskite type oxides, or a composition which includes as a main ingredient the perovskite type oxide represented by the above formula 3, namely, a mixture which includes the perovskite type oxide represented by the above formula 3. For instance, a substance which can not affect a detrimental effect to the material for the interconnector, and which carries preferable physical properties such as electrical conductivity, thermal resistance, corrosion resistance, and oxidation resistance, etc., may be mixed with the perovskite type oxide represented by the above formula 3 in order to prepare the material for the protective layer.

Further, as for the material for the protective layer, a denseness may be required to the extent that the calcium which is included in the interconnector film 5 does not react with the zirconia which is included in the air electrode 4, that is, to the extent that the protective layer does not allow the calcium which is included in the interconnector film 5 to pass through it. Preferably, the denseness is desirable to be to the extent that the protective layer does not allow water vapor to pass through it.

By using the materials as mentioned above, film formations of the intermediate layer 6, the interconnector film 5 and the protective film 7 are performed on the fuel electrode 2 as the base member in that order. For the film formations, any known or new film formation method, such as the slurry coating method, the coating and thermal decomposition method, the slurry spraying and decomposition method, the sol-gel method, the dipping method (dip-coating method), the spin coating method, the tape casting method, the screen printing method, the chemical vapor deposition method (CVD), the physical vapor deposition method (PVD), the electrophoretic deposition method (EPD), the electro-chemical vapor deposition method (EVD), the EVD-CVD method, the vacuum deposition method, the ion plating method, the spattering method, the laser ablation method, the plasma spraying method, the atmospheric plasma spraying method, the vacuum plasma spraying method, the co-sintering method (It is a concurrently sintering method wherein the fuel electrode 2 in the state of a green form and a green film which is prepared by the tape casting method and attached to the green fuel electrode are sintered at the same time.), or the like, may be used.

Figure 3:
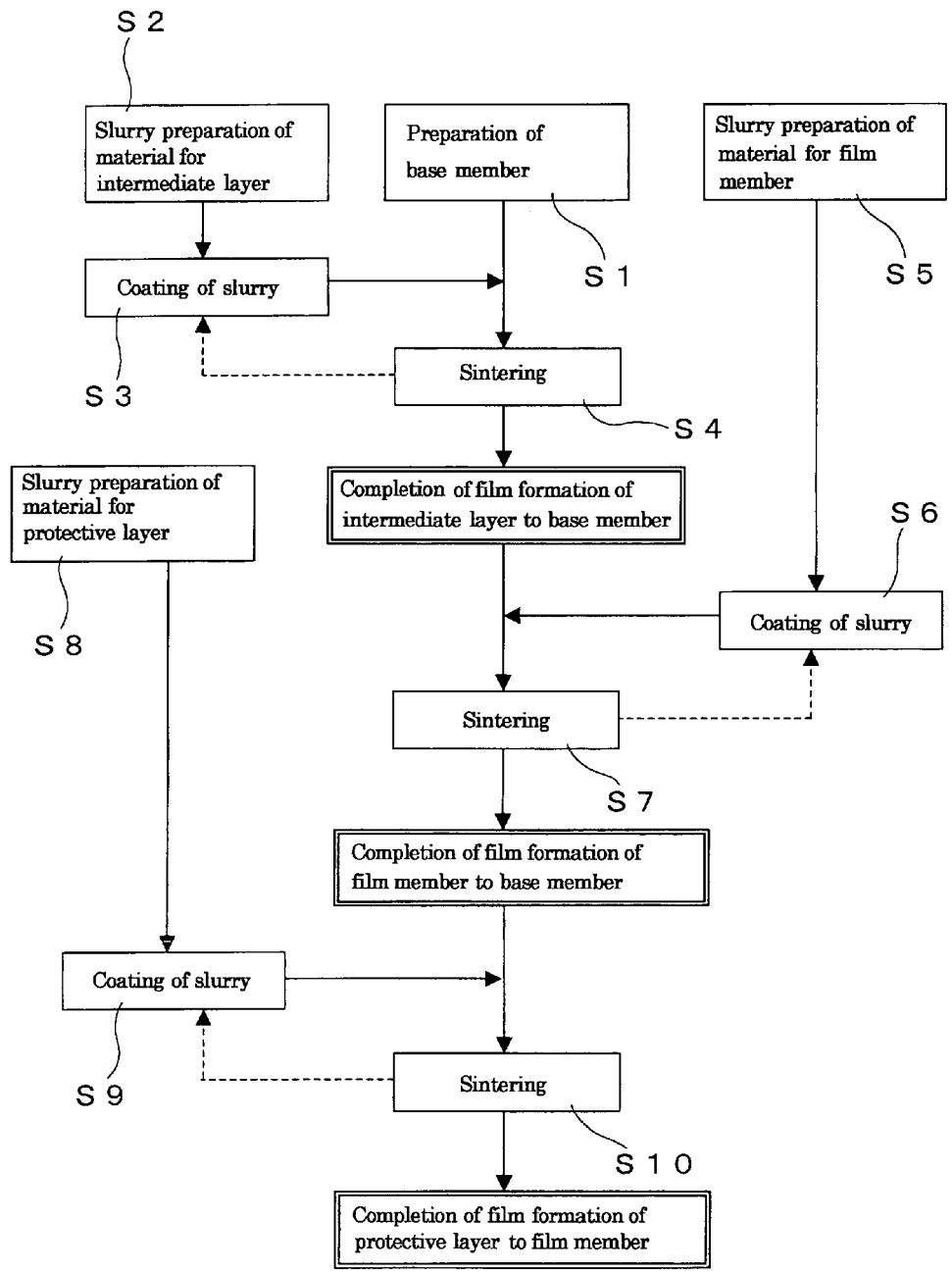
FIG. 3 is a flow chart which illustrates an embodiment of the method for manufacturing the film formed article according to the sent invention.

In this embodiment, by the slurry coating method, the intermediate layer 6, the interconnector film 5 and the protective film 7 are formed on the fuel electrode 2 in that order. FIG. 3 shows this procedure. That is, the intermediate layer 6 is formed as film on the fuel electrode 2, by preparing a fuel electrode 2 which functions as the base member with a material for the fuel electrode (S1), slurrying a material for the intermediate layer (S2), coating the obtained slurry to the fuel electrode 2 as the base member (S3), subjecting the coated article to thermal treatment (sintering) (S4). Next, the interconnector layer 5 is formed as film on the intermediate layer 6 by slurrying a material for the interconnector (S5), coating the obtained slurry to the intermediate layer 6 (S6), and subjecting the coated article to thermal treatment (sintering) (S7). Then, the protective layer 7 is formed as film on the interconnector layer 5, by slurrying a material for the protective layer (S8), coating the obtained slurry to the interconnector film 5 (S9), subjecting the coated article to thermal treatment (sintering) (S10). In the case of utilizing the slurry coating method is used, there is an advantage that it does not seek equipments on a large scale and thus it is economical, as compared with the physical vapor deposition method, the chemical vapor deposition method, the electro-chemical vapor deposition method, and the flame spraying methods, etc. In addition, another advantage that the film thickness is easily controlled by adjusting the concentration of the slurry, and regulating the frequency of slurry coating and sintering is also provided. To control the film thickness by the concentration of the slurry and the frequency of slurry coating and sintering can bring many preferable effects, such as an enhancement in yield, an improvement in the performance of the fuel cell by realizing more thinner shape, and a cost reduction which can be attained by decreasing the amount of wasted material on the basis of the fact that the amount necessitated for preparing a dense film having the required thickness becomes obvious, etc.

With respect to the respective thicknesses of the protective layer 7, the intermediate layer 6, and the interconnector film 5, the thinner they become, the more they are preferable from the viewpoint of the electric resistance which becomes small. However, if the interconnector film 5 is extremely thin, there is a fear that the film does not carry out the functions necessitated for the interconnector film itself, such as the function of separating the fuel gas from the air. If the intermediate layer 6 is extremely thin, there is a fear that the calcium in the material for the interconnector comes to flow out toward the zirconia in the material for the fuel electrode, and thus the dense interconnector film can be formed no longer or the dense interconnector film can be stably maintained no longer. If the protective layer 7 is extremely thin, there is a fear that the calcium in the material for the interconnector is reacted with the zirconia in the material for the air electrode, and the calcium comes to flow out from the material for the interconnector to the fuel electrode or the air electrode, and thus the dense interconnector film can be stably maintained no longer. Incidentally, the minimum film thickness capable of preparing a dense film may be varied by the method for film formation to be used. It is because the thickness to be able to form a dense film depends on which film formation method is chosen. When the slurry coating method is adopted as the film formation method, it is desirable to assume the film thicknesses of the protective layer 7, the intermediate layer 6, and the interconnector film 5 to be not less than 5 μm, individually. Further, it is more desirable that the film thickness of the interconnector film 5 is larger than that of the intermediate layer 6 and that of the protective layer 7. Furthermore, with respect to the thicknesses of the intermediate layer 6 and the protective layer 7, it is preferable to be not more than 20 μm, individually. More desirably, it is not more than 10 μm, and most desirably, it is not more than 5 μm. With respect to the thickness of the interconnector film 5, it is preferable to be not more than 40 μm, more desirably, not more than 30 μm, and most desirably, not more than 20 μm.

As for powder of the material for the intermediate layer, of the material for the interconnector, or of the material for the protective layer, to prepare a slurry, it is preferable to have particle sizes in the range of 0.1-5 μm. Further, because a higher filling rate is theoretically ideal for preparing a dense film, it is preferable that in the powder relatively small particles and relatively large particles are blended with a good balance. For instance, in this embodiment, regarding the powder of $(Sr_{0.9}La_{0.1})(Ti_{0.9}Nb_{0.1})O_3$ which is the material for the intermediate layer, particles which have a mean particle size of 0.4 μm, and particles which have a mean particle size of 2 μm are blended with a volume ratio of 9:1. Further, with respect to the powder of $(La_{0.75}Ca_{0.27})(Cr_{0.9}Co_{0.1})O_3$ which is the material for the interconnector, the mean particle size is regulated to become to 0.7 μm. Moreover, with respect to the powder of $La_{0.6}Sr_{0.4}MnO_3$ which is the material for the protective layer, the mean particle size is regulated to become to 0.9 μm.

The solvent to be used for preparing a slurry of the material for the intermediate layer, of the material for the interconnector, or of the material for the protective layer, may not be especially limited, and, for instance, can be selected from among water or aqueous solutions (for instance, nitric acid aqueous solution, acetic acid aqueous solution, and aqueous solutions of organic acid salts, etc.), and organic solvents (for instance, toluene and isopropanol, etc.). Especially, the use of the organic solvent is desirable because there is no fear that the components of the material for the intermediate layer, the material for the interconnector, or the material for the protective layer are solved to the solvent. When the organic solvent is used, the addition of additives, such as binder, deflocculant, antifoaming agent, and dispersing agent, etc., may be permitted. On the other hand, when water or aqueous solution is used as a solvent, the addition of additives, such as binder, antifoaming agent, dispersing agent, thickener, and surfactant etc., may be permitted.

For instance, in this embodiment, all of the slurry for the intermediate layer 6, the slurry for the interconnector film 5, and the slurry for the protective layer 7 are prepared under the same condition, and, in order to attain the individually prescribed film thickness, the respective frequencies of coating and sintering of the slurry are regulated in accordance with the respective thicknesses. Incidentally, the lesser the coating amount of slurry per a time and the larger the number of the sintering, the denser film can be obtained.

Generally, the higher the sintering temperature, the denser film may be obtained. However, when the treatment is proceeded at a extremely high temperature, there is a fear that the physical properties of the fuel electrode 2 are changed, and thus it can function no longer as the fuel electrode 2. Therefore, it is desirable that the sintering temperature is about 1300-1500° C. Moreover, the sintering time per a time is set to be about 1-10 hours, preferably, 1-3 hours, and the temperature rising or dropping rate is set to be at about 100-233° C./hr, preferably about 200° C./hr. For instance, in this embodiment, the sintering temperature is set to be 1400° C., the sintering time per a time is set to be 3 hours, and the temperature rising or dropping rate is set to be at 200° C./hr.

As the electrolyte film 3 which is intended to be provided between the fuel electrode 2 and the air electrode film 4, it is desirable, for example, to use a YSZ film which is dense to the extent that the fuel gas and air can not pass through. Incidentally, depending on the kind of the film forming method, YSZ of the electrolyte film 3 may be incorporated into numerous minute pores resided in the porous fuel electrode 2. Therefore, as compared with the case that the fuel electrode film 2 is formed onto the plate of YSZ as the conventional way, it is possible to enlarge the contacting area of the fuel electrode 2 with the electrolyte film 3 in order to increase the electrode reaction places and to establish many oxygen ion paths. Thus, it is possible to improve the performance of the solid oxide fuel cell. Although in this embodiment the electrolyte film 3 is made of YSZ, it is not limited thereto and it may use any known or new material capable of utilizing as the electrolyte film 3. For instance, scandia stabilized zirconia ($Zr_{0.89}Sc_{0.1}Ce_{0.01}O_2$(SSZ)) may be used as the electrolyte material. In this case, it is also possible to enlarge the contacting area between the electrolyte film 3 and the fuel electrode 2 in order to increase the electrode reaction places.

Air electrode film 4 is provided on the opposite side across the electrolyte film 3 from the porous fuel electrode 2 as shown in FIG. 2. This air electrode film 4 may be composed of a film of lanthanum-strontium-manganite (compound of La, Sr, Mn, and O). This lanthanum-strontium-manganite has been generally used as the material for the air electrode in the solid oxide fuel cell. Furthermore, as the material to be used for the air electrode, the material for the air electrode according to the invention of which patent application has been already filed by the identical applicant is desirable (See, JP HEI4 (1992)-149024A). Particularly, it is desirable to use powder of strontium doped lanthanum manganite wherein the respective elements of the main ingredient of the strontium doped lanthanum manganite are represented as $(LA_{1-x}Sr_x)_{1-y}MnO_{3-z}$, and satisfy $0.2 \leq x < 0.4$ and $0.025 < y < 0.05$. Incidentally, although the subscript z is usually about ±0.1, the value of the z is varied depending on the temperature, the time, the nonstoichiometric amount y, and the substitution amount x. Thus, to define the value accurately does not bring a great sense, and the explanation in detail is omitted herein. According to this material, even in the vicinity of at the operating temperature of the fuel cell, the air electrode shows a single phase and it is chemically stable. Thus, the reactivity to YSZ is small, and a reaction product which can have a detrimental effect on the formation of the YSZ film and on the power generation performance at the power generation operation is not produced. Although in this embodiment the air electrode film 4 is made of the lanthanum-strontium-manganite, the material for the air electrode film 4 is not limited thereto, and as a matter of course any known or new material may be used as the material for the air electrode film. For instance, the material for the air electrode according to the invention of which patent application has been already filed by the identical applicant (See, Japanese patent application No. 2004-222580) and which includes zirconia (YSZ or SSZ, etc.) in its composition may be used. In this case, the calcium included in the material for the interconnector material can be prevented from flowing out to the air electrode which includes zirconia by means of the protective layer 7, and various performances of the interconnector film such as denseness, electrical conductivity, and consistency of its thermal expansion behavior with those of other members can be stably maintained. Moreover, an improvement of the power generation performance can be attained by forming the air electrode with the film, and an enhancement of the strength against the thermal stress and external forces can be attained by simplifying the structure of the single cell 1.

As the film formation method for the electrolyte film 3 and the air electrode film 4, any known film formation method such as the slurry coating method, the coating and thermal decomposition method, or the sol-gel method, etc., can be used, and it is not limited to a specific method.

According to the present invention, since calcium can be prevented from flowing out from the slurry for the interconnector film to the fuel electrode by means of the heat treatment on the film formation, it is possible to form a dense interconnector film 5 made of calcium doped LCO onto the fuel electrode 2 with ease and at a low cost. Owing to the formation of the interconnector film 5 to the fuel electrode 2 as the base member via the intermediate layer 6, a good contact between the fuel electrode 2 and the interconnector film 5 via the intermediate layer 6 can be produced. In this case, because the contact resistance (electric resistance in the contact part) between the fuel electrode 2 and the interconnector can be greatly decreased, the power generation performance (power output per a single cell 1) can be improved. In addition, since the material for fuel electrode generally has a higher mechanical strength, a higher electrical conductivity, and a higher thermal conductivity, as well as a lower cost, as compared with the material for the air electrode, the formation of single cell by using the fuel electrode as the base member can improve the strength and the power generation performance of the fuel cell, and can reduce the manufacturing cost, as compared with the formation of the single cell by using the air electrode as the base member. In addition, since the operating temperature of the fuel cell can be set to about 1000° C. when the interconnector film 5 is made by LCO, the plant efficiency can be improved as compared with the case of using a metallic separator or a metallic interconnector where the operating temperature is obliged to become low. All in all, according to the present invention, it is possible to attain the cost reduction for manufacturing the solid electrolyte oxide type fuel cell, realize the high performance of the fuel cell and make the fuel cell compact.

In addition, the calcium included in interconnector film 5 is prevented from flowing out to fuel electrode 2 by means of the intermediate layer 6. Moreover, even in the case that a material which includes zirconia (for example, YSZ, SSZ, etc.) is used for the air electrode, it is possible to prevent the calcium included in the material for the interconnector from flowing out into the air electrode by means of the protective layer 7. By virtue of the intermediate layer 6 and the protective layer 7, it is possible to prevent calcium which has been included in the interconnector film 5 from outflowing certainly. Thus, it is possible to prevent the interconnector film 5 from pore generation, which results in the formation of the dense interconnector film 5, and the stable preservation of the properties of the interconnector film 5 such as denseness, electrical conductivity, and consistency of its thermal expansion behavior with those of other members. That is, the long-term stability is achieved with respect to the properties necessitated for the interconnector.

Incidentally, the lanthanum chromite-based perovskite type oxide which includes calcium in its composition may cause a chemical reaction of generating $Ca_5(CrO_4)_3OH$ under the condition where the temperature is 1000° C. and excessive steam of the oxidation and reducing atmosphere exists, the condition being the power generation condition of SOFC. Namely, the material of interconnector is corroded by the steam, and the outflow of calcium and chromium are produced by the formation of $Ca_5(CrO_4)_3OH$. Therefore, there is a problem that the electrical conductivity of the interconnector decreases, and the pores are formed in the interconnector which should be dense. Hence, although the intermediate layer 6 and protective layer 7 of the present invention are films which at least have denseness of the extent that calcium does not pass through, it is desirable that they are films which have denseness of the extent that water vapor does not pass through. In this case, even when excessive steam are entrained into the porous fuel electrode, the corrosion of the interconnector by the steam can be interrupted by the intermediate layer 6, and the outflow of calcium and chromium which is produced by the formation of $Ca_5(CrO_4)_3OH$ can be also inhibited. Thus, the formation of pores in the interconnector can be inhibited, and the denseness of the interconnector can be maintained stably. Moreover, the protective layer 7 can arrest the corrosion of the film material of the lanthanum chromite-based perovskite type oxide which includes calcium in its composition by the steam, and the outflow of calcium and chromium due to the formation of $Ca_5(CrO_4)_3OH$. In this case, the formation of pores in the interconnector can be also inhibited, and the denseness of the interconnector can be maintained stably. In addition, regarding the case of stacking the cells, when the steam is mixed with air or the fuel gas, which is caused, for example, by the breakage of a part of cells, it is possible to avoid the necessity for exchanging all cells as far as the protective layers 7 are provided to the interconnector films 5 in each cells. Because, the individual cells can acquire the resistance to water vapor (resistance to humid atmosphere) by virtue of the protective layer 7, and thus the cell stacks can be restored by exchanging only the damaged cell.

When the range of z in the perovskite type oxide represented by the chemical formula 2 which is a main ingredient of the intermediate layer 6 is set to be $-0.05 \leq z \leq 0$, not only the prevention of outflow of calcium included in the interconnector film 5 to the fuel electrode, but also the prevention of outflow of calcium and chromium from the interconnector 5, which results from the fact that the interconnector film 5 of the lanthanum chromite-based perovskite type oxide which includes calcium in its composition produces $Ca_5(CrO_4)_3OH$ under the existence of the steam, can be attained. By these facts, the formation of pores in the interconnector film 5 which has been formed as dense form can be inhibited, and the denseness of the interconnector can be maintained stably. Incidentally, when the range of z is as $0 < z \leq 0.1$, the perovskite type oxide represented by the chemical formula 2 becomes an A site defective type perovskite type oxide, and thus, Ca as an alkaline earth metal element is solved thereto so as to form solid solution. In this case, the electrical conductivity can be improved while maintaining the capability of blocking the steam, although the capability of preventing the calcium included in the interconnector film 5 from flowing out to the fuel electrode 2 may go down to some extent.

Similarly, with respect to the protective layer 7, when the range of z in the perovskite type oxide represented by the chemical formula 3 which is a main ingredient of the protective layer 7 is set to be $-0.05 \leq z \leq 0$, not only the prevention of outflow of calcium included in the material for interconnector to the air electrode 4 side, provided that the material including zirconia (for example, YSZ and SSZ, etc.) is used as the air electrode 4; but also the prevention of outflow of calcium and chromium from the interconnector 5, which results from the fact that the interconnector film 5 of the lanthanum chromite-based perovskite type oxide which includes calcium in its composition produces $Ca_5(CrO_4)_3OH$ under the existence of the steam, can be attained. By these facts, the formation of pores in the interconnector film 5 which has been formed as dense form can be inhibited, and the denseness of the interconnector can be maintained stably. Incidentally, when the range of z is as $0 < z \leq 0.1$, the perovskite type oxide represented by the chemical formula 3 becomes an A site defective type perovskite type oxide, and thus, Ca as an alkaline earth metal element is solved thereto so as to form solid solution. In this case, the electrical conductivity can be improved while maintaining the capability of blocking the steam, although the capability of preventing the calcium included in the interconnector film 5 from flowing out to air electrode 4 may go down to some extent. Therefore, when the protective layer 7 does not come into contact with the material which includes zirconia or the material which comes into contact with the protective layer 7 does not contain zirconia, the outflow of Ca from the film material 5 does not happen, and thus the electrical conductivity can be improved while preventing the corrosion by steam.

Although above mentioned embodiment is a preferable one of the present invention, this invention is not limited thereto, and various modifications and alternations can be done without deviating from the spirit or purport of the present invention. For instance, this invention is not limited to the application to the film formation for the interconnector on the fuel electrode 2 of the solid oxide type fuel cell. Even if it is a fuel cell other than the flat type and the solid oxide type, or it is a structure other than the fuel cell, it is possible to apply the present invention as far as the structure needs to form a film member of the lanthanum chromite-based perovskite type oxide which includes calcium in its composition to a base member which has zirconia in its composition.

Further, the material for the protective layer is not limited to the above-mentioned examples. In addition, in the case that there is no chance of coming into contact with the material which includes zirconia in its composition and the steam does not exist in the air electrode side, to provide the protective layer 7 are not necessarily required.

Even in the case that the base member (fuel electrode) or the air electrode is made of a material other than the composition of having zirconia therein, but when the base member comprises a material system which has a composition to which calcium (Ca) can be solved so as to form solid solution, there is a fear that the calcium which has been included in the interconnector film happens to react in solid phase with the material which forms the base member or air electrode, and then the calcium flows out from the film member to the base member side or air electrode side. Therefore, the intermediate layer 6 according to the present invention may be provided between the base member which has the composition capable of forming solid solution with calcium and the film member made of the lanthanum chromite-based perovskite type oxide which includes calcium in its composition, and/or, the protective layer 7 according to the present invention may be provided between the air electrode which has the composition capable of forming solid solution with calcium and the film member made of the lanthanum chromite-based perovskite type oxide which includes calcium in its composition.

As the base member or air electrode which has the composition capable of forming solid solution with calcium, for instance, zirconium-based oxides $((Zr_{1-x}A_x)O_2)$, hafnium-based oxides $((Hf_{1-x}A_x)O_2)$, cerium-based oxides $((Ce_{1-x}A_x)O_2)$, 2A family-, 3A family-element-based perovskite type oxides $((L_{1-x}B_x)_{1-z}(D)O_3)$, and 2A family-, 3A family-element-based pyrochlore type oxides $((L_{1-x}B_x)_{2(1-z)}D_2O_7)$, etc., are enumerated. Where the A as mentioned above is one or more elements selected from a group of metal elements (Be, Mg, Ca, Sr, Ba) except radioelements, and metal elements (Sc, Y, lanthanoids (except Pm which is a radioelement) except radioelements. Where the B as mentioned above is one or more elements selected from a group of alkaline earth metal elements (2A family elements of Be, Mg, Ca, Sr, Ba) except radioelements. Where the D as mentioned above is one or more elements selected from a group of transition metals (Sc, Ti, V, Cr, Mn, Fe, Co, Ni, Cu, Y, Zr, Nb, Mo, Ru, Rh, Pd, Ag, lanthanoids, Hf, Ta, W, Re, Os, Ir, Au) which belong to the fourth, fifth and sixth periods of the periodic table except platinum (Pt) and radioelements, and alkaline earth metal elements. Moreover, the L mentioned above is one or more elements selected from a group of 3A family transition metal elements (lanthanoids, Sc, Y) except radioelements or more than 2 kinds of elements. Moreover, although $0<x\leqq1$ and $0<z\leqq0.1$ in general, in the case of the fluorite type oxides of zirconium-based oxides, hafnium-based oxides and cerium-based oxides, the lesser the substitution amount of the A element (namely, the smaller the x value), the more calcium (Ca) is solved so as to form solid solution. In the case of the perovskite type oxides and the pyrochlore type oxides, the more the A site defect amount z, the more calcium (Ca) is solved as the solid solution (In other words, when the perovskite type oxide or the pyrochlore type oxide is of the A site defect, even when x=1, Ca can be solved so as to form solid solution).

Especially, when the ceria-based fluorite type oxides and the A site defect type lanthanum gallium-based oxides which have been used as an electrolyte material of SOFC, etc., are used as the base member or the air electrode, it is assumed that the calcium contained in the film material flows out to the base member side. Therefore, when any of these materials should be made the base member, and a film member which is made of the lanthanum chromite-based perovskite type oxide should be formed over the base member, the intermediate layer 6 according to the present invention may be provided between the base member and the film member. Also in this case, it is possible to inhibit the solid phase reaction between calcium which has been included in the film member and the materials which composes the base member, and to prevent calcium which has been included in the film member from flowing out to the base material side by virtue of the intermediate layer 6. Thus, it is possible to form a dense film member which comprises the lanthanum chromite-based perovskite type oxide which includes calcium in its composition. Moreover, when it is necessary to contact any of these materials as the air electrode to the film member which comprises the lanthanum chromite-based perovskite type oxide which includes calcium in its composition, the protective layer 7 according to the present invention may be provided between the air electrode and the film member. Also in this case, it is possible to inhibit the solid phase reaction between calcium which has been included in the film member and the materials which composes the air electrode, and to prevent calcium which has been included in the film member from flowing out to the base member air electrode side by virtue of the protective layer 7.

Incidentally, instead of La which is the raw material of the lanthanum-based material to be used for the material for the intermediate layer, the material for the interconnector, and the material for the protective layer material, an intermediate product for lanthanum (lanthanum concerate) may be utilized from the viewpoint of cost reduction.

EXAMPLE

In accordance with the above-mentioned embodiment, a single cell was manufactured as follows (This single cell is called "single cell of Example".). Porous fuel electrode 2 as a base member was prepared by sintering a mixture of NiO—YSZ($Zr_{0.92}Y_{0.08}O_2$) at 1400° C. Then, onto the fuel electrode 2, a intermediate layer 6 was formed as film by the slurry coating method with using $Sr_{0.9}La_{0.1}Ti_{0.9}Nb_{0.1}O_3$ as the material for intermediate layer. Further, onto the intermediate layer 6, an interconnector film 5 was formed by the slurry coating method with using $La_{0.75}Ca_{0.27}Cr_{0.9}Co_{0.1}O_3$. Furthermore, onto the interconnector film 5, a protective layer 7 was formed as film by the slurry coating method with using $La_{0.6}Sr_{0.4}MnO_3$.

Incidentally, in the above processes, when preparing slurry powder of the material for the intermediate layer ($Sr_{0.9}La_{0.1}Ti_{0.9}Nb_{0.1}O_3$) was obtained by using a planetary ball mill so that the particles having a mean particle size of 0.4 μm in and the particles having a mean particle size of 2 μm were blended in the volume ratio of 9:1. Powder of the material for the interconnector layer ($La_{0.75}Ca_{0.27}Cr_{0.9}Co_{0.1}O_3$) was obtained by using a planetary ball mill so that the particles thereof had a mean particle size of 0.7 μm. Powder of the material for the protective layer ($La_{0.6}Sr_{0.4}MnO_3$) was obtained by using a planetary ball mill so that the particles thereof had a mean particle size of 0.9 μm. The compositions of the slurries individual for the intermediate layer 6, the interconnector film 5 and the protective layer 7 were, in common, to be 10 g of polyvinyl butyral as a binder, 10 ml of dibutyl phthalate as a plasticizer, 2 ml of fish oil as a deflocculant, 2 ml of Triton X as an antifoaming agent, and 600 ml of toluene and 1200 ml of isopropanol as solvents, based on 100 g of the powder of the film forming material, as shown in Table 1, and were prepared by mixing thereof. The sintering conditions individual for the intermediate layer 6, the interconnector film 5 and the protective layer 7 were, in common, that the sintering temperature was 1400° C., and the sintering time per a time was set to be 3 hours, and the temperature rising rate was set to be 200° C./hr. Coating and sintering of the slurry for intermediate layer 6 were repeated 4 times, coating and sintering of the slurry for interconnector layer 5 were repeated 14 times, and coating and sintering of the slurry for protective layer 7 were repeated 7 times.

TABLE 1

| | |
|---|---|
| Film forming material | 100 g |
| Polyvinyl butyral (binder) | 10 g |
| Dibutyl phthalate (plasticizer) | 10 ml |
| Fish oil (deflocculant) | 2 ml |
| Triton X (antifoaming agent) | 2 ml |
| Toluene (solvent) | 600 ml |
| Isopropanol (solvent) | 1200 ml |

As a control, a single cell of which shape was same with that of Example was manufactured by replacing the material for intermediate layer as follows (This single cell is called "single cell of Control".). Incidentally, protective layer 7 was not provided in the single cell of control. Porous fuel electrode 2 as a base member was prepared by sintering a mixture of NiO—YSZ($Zr_{0.92}Y_{0.08}O_2$) at 1400° C. Then, onto the fuel electrode 2, a intermediate layer 6 was formed as film by the slurry coating method with using $CaTi_{0.95}Nb_{0.05}O_3$ as the material for intermediate layer. Further, onto the intermediate layer 6, an interconnector film 5 was formed by the slurry coating method with using $La_{0.75}Ca_{0.27}Cr_{0.9}Co_{0.103}$. Incidentally, in the above processes, when preparing slurry, powder of the $CaTi_{0.95}Nb_{0.05}O_3$ was obtained by using a planetary ball mill so that the particles having a mean particle size of 0.3 μm and the particles having a mean particle size of 2 μm were blended in the volume ratio of 4:1. Powder of the $La_{0.75}Ca_{0.27}Cr_{0.9}Co_{0.1}O_3$ was obtained by using a planetary ball mill so that the particles thereof had a mean particle size of 0.7 μm. The compositions of the slurries individual for the intermediate layer 6 and the interconnector film 5 were set in accordance with Table 1. The sintering conditions individual for the intermediate layer 6 and the interconnector film 5 were, in common, that the sintering temperature was 1450° C., and the sintering time per a time was set to be 3 hours, and the temperature rising rate was set to be 200° C./hr. Coating and sintering of the slurry for intermediate layer 6 were repeated 2 times, coating and sintering of the slurry for interconnector layer 5 were repeated 15 times.

In both the single cell of Example and the single cell of Control, as material for the air electrode, lanthanum-strontium-manganite was used. Further, $SSZ(Zr_{0.89}Sc_{0.1}Ce_{0.01}O_2)$ was used as an electrolyte material for the single cell of Example, and $YSZ(Zr_{0.92}Y_{0.08}O_2)$ was used as an electrolyte material for the single cell of Control. There is no significant difference in the mechanism of the electrode reaction between the YSZ and the SSZ.

Figure 4:
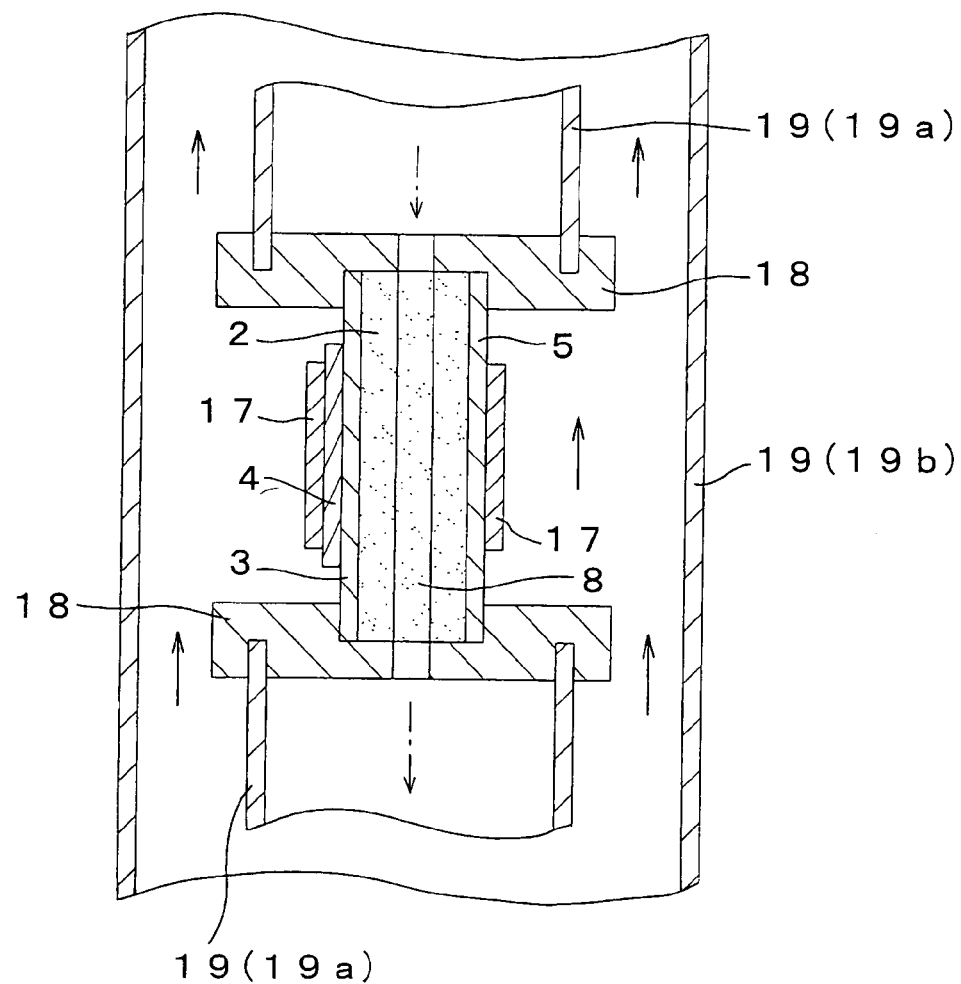
FIG. 4 is a central longitudinal sectional view where the outline constitution of the experimental apparatus for the measurement examination of the power generation performance of single cell is shown.

With respect to the single cells of Example and Control, power generation performance was measured by using an experimental apparatus as shown in FIG. 4. In FIG. 4, the numeral 18 denotes a sealing member which functions to support the single cell and to separate the fuel gas and air not so as to be mixed together, and the numeral 17 denotes a mesh of Pt which was used as collector. Magnetic tube 19 has a dual structure of an inner tube 19a and an outer tube 19b. The fuel gas (hydrogen) flows inside of the inner tube 19a (the arrow of one point chain line in FIG. 4 shows the flow of the fuel gas.), and air flows between the inner tube 19a and the outer tube 19b (the arrow of the solid line in FIG. 4 shows the flow of air). The fuel gas and the air are separated each other by the interconnector film 5, the electrolyte film 3, the sealing member 18, and the magnetic tube 19, not so as to be mixed each other. The gas sealing was performed by attaching a glass ceramics and a glass plate on the side of the single cell. The power generation performance was determined under the condition of 1000° C., with introducing pure hydrogen humidified with 20° C. into the fuel electrode 2 at 0.3 L/min, and introducing air which involved water vapor of being at a level as in the atmosphere, namely, not dry air into the air electrode with 1 L/min.

Figure 5:
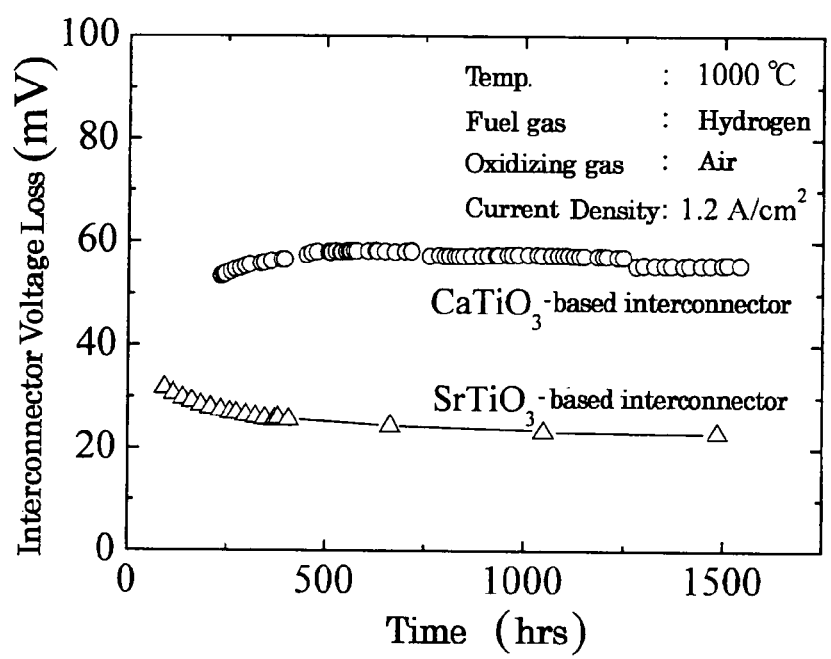
FIG. 5 is a graph where a change of the voltage loss of the interconnector of the solid oxide fuel cell that applies this invention is shown along time lapse.

Time lapse changes of voltage loss (mV) of the inter connector in the single cells of Example and Control are shown in FIG. 5. The plot of Δ shows the result of Example, and the plot of ○ shows the result of Control. It can be confirmed that when comparing at the same current density (1.2 A/cm²), the voltage loss of the interconnector in Example decreased up to 45% of that of Control. Moreover, with respect to the single cell of Control, the solid phase reaction of calcium and zirconia was observed after electricity production of 1500 hours. On the other hand, such a solid phase reaction was not observed in the single cell of Example.

The effectiveness of intermediate layer 6 and protective layer 7 used in Example was proven by the results of above experiments. Since the effectiveness of the $(Sr_{1-x}La_x)_{1-z}(Ti_{1-y}Nb_y)O_3$ as the material for the intermediate layer was confirmed, similar effects with this Example can be expected in the cases that a part of or all of the elements which compose the above composition are respectively substituted by one or more elements which are known as elements showing same or analogical properties with the element to be substituted. Concretely, as for the composition previously explains by using chemical formula 2, the similar effect with this Example can be expected. Further, since the effectiveness of the $La_{0.6}Sr_{0.4}MnO_3$ as the material for the protective layer was confirmed, similar effects with this Example can be expected in the cases that a part of or all of the elements which compose the above composition are respectively substituted by one or more elements which are known as elements showing same or analogical properties with the element to be substituted. Concretely, as for the composition previously explains by using chemical formula 3, the similar effect with this Example can be expected.

The invention claimed is:

1. A method for manufacturing a film formed article, wherein an interconnector film made of a lanthanum chromite-based perovskite oxide which includes calcium (Ca) in its composition is formed over a fuel electrode of a solid oxide fuel cell, the fuel electrode having a composition forming solid solution with calcium (Ca), the method comprising: forming as film a non-electrolyte intermediate layer including as a main ingredient a single phase perovskite oxide and having electronic conduction properties on the fuel electrode, the perovskite oxide is represented by a chemical formula:

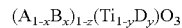

$(A_{1-x}B_x)_{1-z}(Ti_{1-y}D_y)O_3$ wherein A is one or more elements selected from a group consisting of alkaline earth metal elements other than radium (Ra); B is one or more elements selected from a group consisting of elements of scandium (Sc), yttrium (Y) and lanthanoids; D is one or more elements selected from a group consisting of transition metal elements belonging to the fourth, fifth and sixth periods of the periodic table except platinum (Pt) and radioelements, and typical metal elements except 1A family elements, mercury (Hg), radium (Ra) and polonium (Po); and $0<x\leq0.5$, $0\leq y\leq0.5$ and $-0.05\leq z\leq0$; and forming the interconnector film on the intermediate layer.

2. A method for manufacturing a film formed article, wherein an interconnector film made of a lanthanum chromite-based perovskite oxide which includes calcium (Ca) in its composition is formed over a fuel electrode of a solid oxide fuel cell, the fuel electrode having a composition forming solid solution with calcium (Ca), the method comprising: forming as film a non-electrolyte intermediate layer including as a main ingredient a single phase perovskite oxide and having electronic conduction properties on the fuel electrode, the perovskite oxide is represented by a chemical formula:

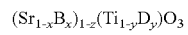

$(Sr_{1-x}B_x)_{1-z}(Ti_{1-y}D_y)O_3$ wherein B is one or more elements selected from a group consisting of elements of scandium (Sc), yttrium (Y) and lanthanoids; and D is one or more elements selected from a group consisting of transition metal elements belonging to the fourth, fifth and sixth periods of the periodic table except platinum (Pt) and radioelements, and typical metal elements except 1A family elements, mercury (Hg), radium (Ra) and polonium (Po); and $0<x\leq0.5$, $0\leq y\leq0.5$ and $-0.05\leq z\leq0$; and forming the interconnector film on the intermediate layer.

3. A method for manufacturing a film formed article, wherein an interconnector film member made of a lanthanum chromite-based perovskite oxide which includes calcium (Ca) in its composition is formed over a fuel electride of a solid oxide fuel cell, the fuel electrode having a composition forming solid solution with calcium (Ca), the method comprising: forming as film a non-electrolyte intermediate layer including as a main ingredient a single phase perovskite oxide and having electronic conduction properties on the fuel electrode, the perovskite oxide is represented by a chemical formula:

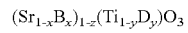

$(Sr_{1-x}B_x)_{1-z}(Ti_{1-y}D_y)O_3$ wherein B is one or more elements selected from a group consisting of elements of scandium (Sc), yttrium (Y) and lanthanoids; and D is one or more elements selected from a group consisting of elements of vanadium (V), niobium (Nb) and tantalum (Ta); and $0<x\leq0.5$, $0\leq y\leq0.5$ and $-0.05\leq z\leq0$; and forming the interconnector film on the intermediate layer.

4. A method for manufacturing a film formed article, wherein an interconnector film member made of a lanthanum chromite-based perovskite oxide which includes calcium (Ca) in its composition is formed over a fuel electrode of a solid oxide fuel cell, the fuel electrode having a composition forming solid solution with calcium (Ca), the method comprising: forming as film a non-electrolyte intermediate layer including as a main ingredient a single phase perovskite oxide and having electronic conductor properties on the fuel electrode, the perovskite oxide is represented by a chemical formula:

$$(Sr_{1-x}B_x)_{1-z}(Ti_{1-y}D_y)O_3$$

wherein $0<x\leq0.5$, $0\leq y\leq0.5$ and $-0.05\leq z\leq0$; and forming the interconnector film on the intermediate layer.

5. The method for manufacturing a film formed article according to claim 1, wherein a protective layer including as a main ingredient a single phase perovskite oxide and having electronic conduction properties is further formed on a surface of the interconnector film, wherein the perovskite oxide of the protective layer is represented by a chemical formula:

$$(G_{1-x}H_x)_{1-z}(J_{1-y}L_y)O_3$$

wherein G is one or more elements selected from a group consisting of elements of scandium (Sc), yttrium (Y) and lanthanoids; H is one or more elements selected from a group consisting of alkaline earth metal elements other than radium (Ra); and J and L are individually one or more elements selected from a group consisting of transition metal elements belonging to the fourth, fifth and sixth periods of the periodic table except platinum (Pt) and radioelements, and typical metal elements except 1A family elements, mercury (Hg), radium (Ra) and polonium (Po); and $0<x\leq1$, $0\leq y\leq0.5$ and $-0.05\leq z\leq0$, providing that when H is calcium (Ca) J is not chromium (Cr).

6. The method for manufacturing a film formed article according to claim 1, wherein a protective layer including as a main ingredient a single phase perovskite oxide and having electronic conduction properties is further formed on the surface of the interconnector film, the perovskite oxide of the protective layer is represented by a chemical formula:

$$(G_{1-x}H_x)_{1-z}(J_{1-y}L_y)O_3$$

wherein G is one or more elements selected from a group consisting of elements of scandium (Sc), yttrium (Y) and lanthanoids; H is one or more elements selected from a group consisting of elements of magnesium (Mg), calcium (Ca), strontium (Sr) and barium (Ba), J is one or more elements selected from a group consisting of transition metal elements belonging to 6A, 7A and 8 family elements in the fourth period of the periodic table; and L is one or more elements selected from a group consisting of transition metal elements belonging to the fourth, fifth and sixth periods of the periodic table except platinum (Pt) and radioelements, and typical metal elements except 1A family elements, mercury (Hg), radium (Ra) and polonium (Po); and $0<x\leq1$, $0\leq y\leq0.5$ and $-0.05\leq z\leq0$, providing that when H is calcium (Ca) J is not chromium (Cr).

7. The method for manufacturing a film formed article according to claim 1, wherein a protective layer including as a main ingredient a single phase perovskite oxide and having electronic conduction properties is further formed on the surface of the interconnector film, the perovskite oxide of the protective layer is represented by a chemical formula:

$$(G_{1-x}H_x)_{1-z}(J_{1-y}L_y)O_3$$

wherein G is one or more elements selected from a group consisting of elements of scandium (Sc), yttrium (Y) and lanthanoids; H is one or two elements selected from a group consisting of elements of strontium (Sr) and calcium (Ca); J is one or more elements selected from a group consisting of transition metal elements belonging to 6A, 7A and 8 family elements in the fourth period of the periodic table; and L is one or more elements selected from a group consisting of transition metal elements belonging to the fourth period of the periodic table; and $0<x\leq1$, $0\leq y\leq0.5$ and $-0.05\leq z\leq0$, providing that when H is calcium (Ca) J is not chromium (Cr).

8. The method for manufacturing a film formed article according to claim 1, wherein a protective layer including as a main ingredient a single phase perovskite oxide and having electronic conduction properties is further formed on the surface of the interconnector film, the perovskite oxide of the protective layer is represented by a chemical formula:

$$(La_{1-x}Sr_x)_{1-z}(J_{1-y}L_y)O_3$$

wherein J is one or more elements selected from a group consisting of transition metal elements belonging to 6A, 7A and 8 family elements in the fourth period of the periodic table; and L is one or more elements selected from a group consisting of transition metal elements belonging to the fourth period of the periodic table; and $0<x\leq1$, $0\leq y\leq0.5$ and $-0.05\leq z\leq0$.

9. The method for manufacturing a film formed article according to claim 1, wherein the fuel electrode includes zirconia in its composition.

* * * * *